Nov. 3, 1970     J. K. MERCK     3,537,143

BALE OPENING APPARATUS

Filed Oct. 1, 1968     3 Sheets-Sheet 1

Nov. 3, 1970   J. K. MERCK   3,537,143

BALE OPENING APPARATUS

Filed Oct. 1, 1968   3 Sheets-Sheet 2

United States Patent Office 3,537,143
Patented Nov. 3, 1970

3,537,143
BALE OPENING APPARATUS
James King Merck, Pendleton, S.C., assignor to Maremont Corporation, Chicago, Ill., a corporation of Illinois
Filed Oct. 1, 1968, Ser. No. 764,183
Int. Cl. D01g 7/06
U.S. Cl. 19—80                                    12 Claims

ABSTRACT OF THE DISCLOSURE

Cotton bales are opened by plucking fibers from discrete areas of a bale face, the areas being sequentially plucked and each extending the full length and a minor part only of the width of the bale face. The apparatus includes a plurality of short plucking rolls mounted beneath and spaced longitudinally of each of two parallel sections of a bale-supporting platform, the platform preferably being provided with steps thereon to better support bales moved therealong by driven cages. Cross-conveyors transfer the bales between the platform sections at each end thereof, to provide a closed path of bale travel, and effect during each transfer a reversal of the leading end-trailing end orientation of each bale. Each plucker roll and its associated components constitute an independent fiber-producing unit which is so mounted as to be readily accessible for purposes of replacement or repair.

---

This invention relates to the opening of bales of textile fiber, such as cotton, and more particularly to an apparatus and method for efficiently removing fiber from such bales in a manner greatly facilitating subsequent processing and/or blending of the fiber.

When formed in a normal manner, cotton bales consist of superimposed fibrous layers each extending the full length and width of the bale and a minor portion of its thickness. Adherence between the highly compressed fibers within each individual layer is strong, but the adherence between interfacial fibers of adjacent layers is relatively weak. Due to such weak adherence, bale-opening apparatus employing a plucker roll or the like extending across substantially the entire width of a bale tend to at times inadvertently remove all or a substantial part of the entire remaining thickness of a fibrous layer, more or less intact. This may occasion clogging and shut-down of the apparatus, and at best introduces relatively large masses of still highly compressed fibers in the other fibers delivered from the apparatus for subsequent processing and/or blending. The latter result, which of course is detrimental to thorough blending and which necessitates more thorough opening during subsequent processing, frequently also occurs even if the apparatus removes a satisfactorily small layer-thickness, due to there still being insufficient disintegration of the layer in the width direction.

The present invention provides an apparatus and method not subject to the aforesaid disadvantages and yielding uniform quantities of fibers which are relatively opened and are free from highly compressed masses or chunks. Such fibers are well-suited for subsequent blending both by reason of their relatively opened condition and also due to their preferably being supplied in independently-controllable uniform quantities from multiple sources. The invention provides in practice thorough and uniform disintegration of the individual layers of a bale, and the capability of blending fibers from a part of one layer of the bale with fibers from parts of other layers of the same or other bales.

The present invention also provides apparatus which in its preferred form is capable of simultaneously reducing a large number of bales, which is substantially continuous in operation and in direction of bale movement, which produces in effect a reversal of bale orientation during the aforesaid movement so as to avoid bale shingling, which provides uniform bale support during the aforesaid movement, which is compatible with air-stream conveying equipment and may therefore be directly connected with suitable blending or processing machines, and which is of a construction minimizing down-time for repair and/or maintenance.

The various features and advantages of the invention will be evident from the following description of an illustrative embodiment thereof, when read in conjunction with the accompanying drawing in which.

Figure 1:
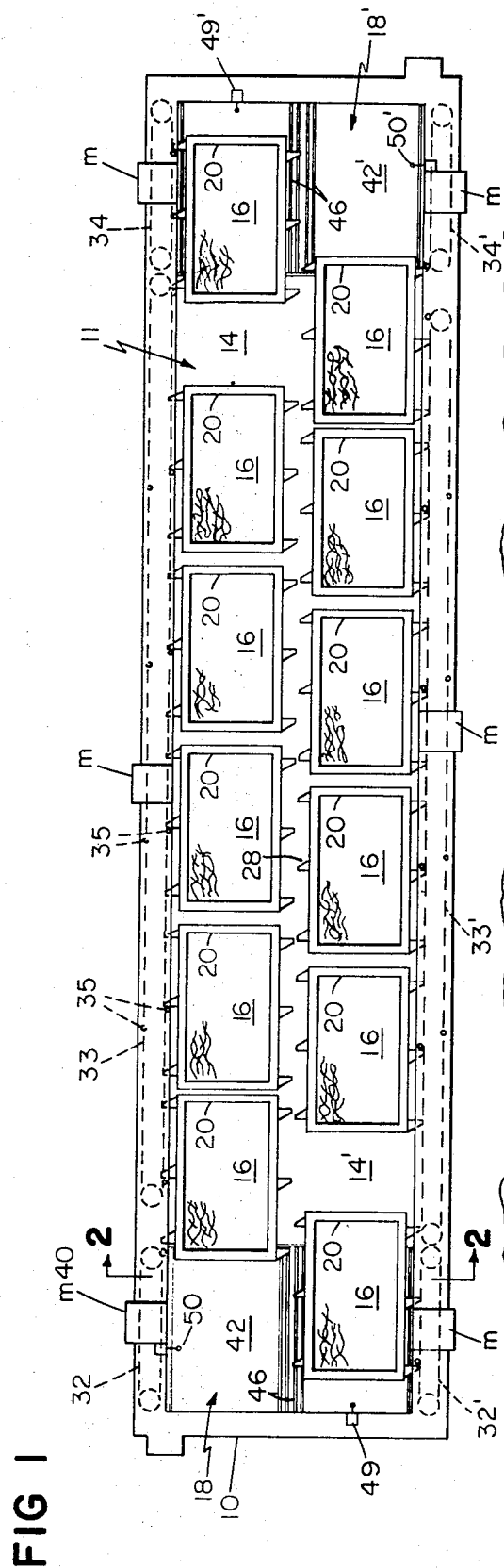
FIG. 1 is a plan view of apparatus according to the invention in operating condition.

Referring more particularly to the drawings, the apparatus consists generally of a frame 10, bale supporting means including a horizontal platform 11 carried by frame 10, bale plucker means including a plurality of plucker units 12, 12' mounted respectively beneath elongate parallel sections 14, 14' of platform 11, and means including vertically-open cages 20 for receiving and moving a plurality of bales 16 longitudinally of platform sections 14, 14' and over the plucker units 12, 12' mounted therebeneath. Bales 16 preferably each rest upon major faces thereof, and illustratively twelve bales are so supported simultaneously by platform 11, there being five extending in longitudinal alignment upon each of elongate sections 14, 14' and one upon each of shorter platform sections 18, 18' which interconnect adjacent ends of sections 14, 14' and define therewith a closed path of bale travel upon platform 11. The bales 16 are moved about this path of travel, by mechanisms to be subsequently described in greater detail, in a clockwise manner as viewed in FIG. 1, each bale moving endwise from the left end to the right end of platform section 14, then sideways upon section 18' to the right end of section 14', then endwise from the right end of section 14' to the left end thereof, and then sideways upon section 18 to its previous position at the left end of section 14. Such movement continues until the original bales 16 are sufficiently reduced in size for new bales to be deposited within cages 20.

Figure 2:
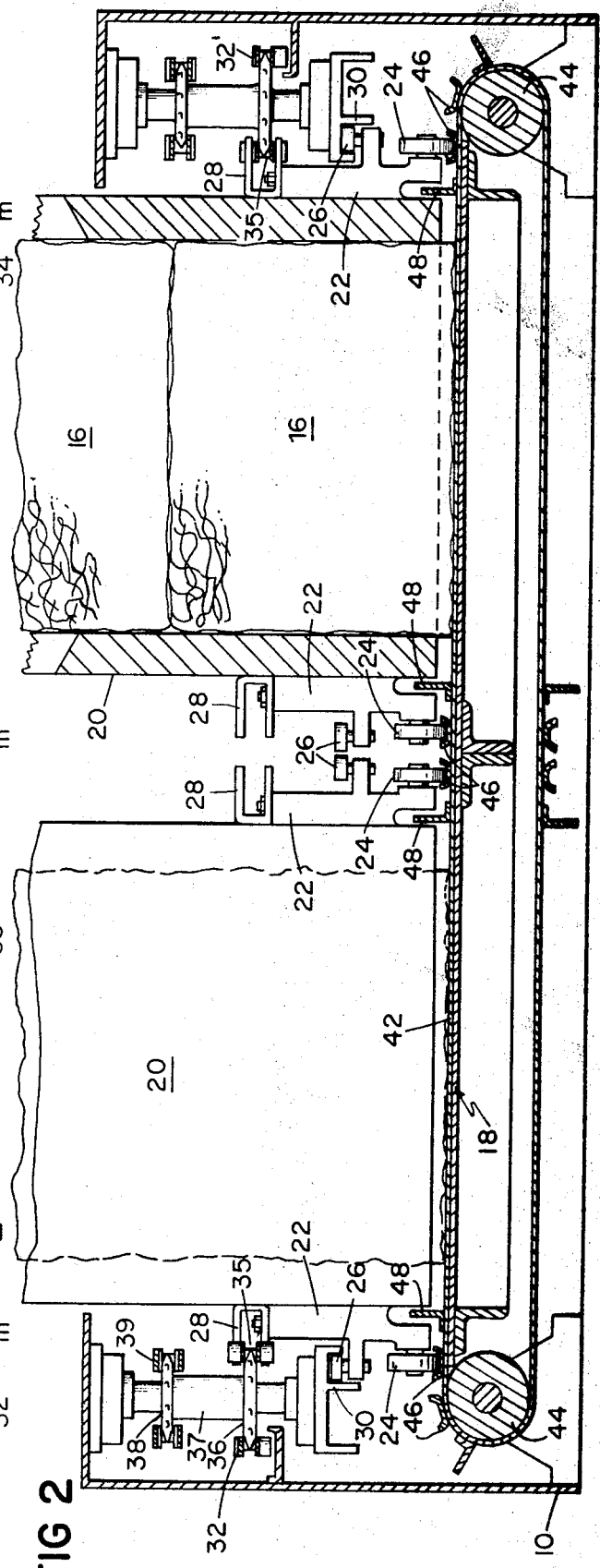
FIG. 2 is an enlarged vertical section taken generally along the line 2—2 of FIG. 1.

Referring particularly to FIGS. 1 and 2, bale cages 20 are of identical construction each including a pair of side brackets 22 mounting downwardly extending running wheels 24 and laterally projecting guide wheels 26 and driving lugs 28. Wheels 24 support cages 20 for movement upon platform sections 14, 14', while maintaining the open cage bottoms spaced thereabove. Wheels 26 are received within guide members 30, 30', carried by frame 10 adjacent only the outer sides of the respective platform sections 14, 14', so as to direct cages 20 and the bales 16 therein along a precise path of travel longitudinally of such platform sections. Series of endless chains 32, 33, 34 and 32', 33', 34', extending along opposite sides of frame 10 and each having a plurality of pins 35 adapted to drivingly engage lugs 28 of the cages 20 adjacent thereto, move the cages and bales along respective platform sections 14, 14'. Each of the chains are positively driven, the chain 32 being entrained about a sprocket 36 driven through frame-supported shaft 37, sprocket 38, and auxiliary chain 39 by motor M40, as shown in FIGS. 1 and 2. Chains 33, 34, 32', 33' and 34' may be similarly mounted and driven by their own motors M, all of the motors being synchronized so as to drive the longer chains 33, 33' at one selected speed and shorter chains 32, 34, 32', 34' at another, faster speed. The latter chains, having a greater speed and being located at opposite end portions of platform sections 14, 14', move the bale cages 20 onto and off of opposite ends of these two sections relatively rapidly, from and to transverse platform sections 18, 18'. In addition to negating congestion of the cages 20 at the terminal ends of platform sections 14, 14', the relative rapidity of the transfer insures that the plucking operations transpiring upon those sections can proceed at a maximum rate and that all but a minimum amount of the time during which a bale is upon the apparatus is devoted to its plucking.

While bales 16 upon platform sections 14, 14' are slid therealong by cages 20, they and the cages are moved upon shorter sections 18, 18' by endless conveyor aprons 42, 42' respectively extending longitudinally of those sections, which themselves extend transversely of frame 10 of the apparatus. As shown in FIG. 2, conveyor 42 is entrained about rolls 44, at least one of which is connected to a driving motor (not shown), so that its upper flight passes over and longitudinally of platform section 18. The outwardly facing surface of conveyor apron 42 preferably has a low coefficient of friction so that the bales 16 may be moved easily thereon and therefrom, and is provided with guide tracks 46 to receive cage wheels 24. If desired, L-shaped shields 48 may also be provided upon conveyor 42 to minimize lint escaping from the open bottoms of cages 20 while they are supported upon and moved sideways along platform section 18.

Spring-loaded microswitches 49, 50 are mounted upon frame 10 as shown in FIG. 1, for actuation by engagement with bale cages 20, to respectively initiate and stop each cycle of operation of conveyor 42; and corresponding microswitches 49', 50' are provided at the opposite end of frame 10 in association with the similarly mounted and driven conveyor 42'. As the lower-left bale cage 20 of FIG. 1 continues to be moved by chain 32' from platform section 14' and onto section 18, the cage will engage microswitch 49 and actuate conveyor 42. Conveyor 42 will then transport the sideways-oriented cage 20 and bale 16 to the opposite end of platform section 18 and into engagement with microswitch 50, stopping the conveyor's operation. Chain 32 then rapidly moves the caged bale endwise from platform section 18 and onto section 14, along which it is transported by chain 33. Upon reaching the terminal end of platform section 14, the bale is moved first onto, then longitudinally of, and finally from that section, by chain 34, conveyor 42' and chain 34', respectively. It is then again engaged by chain 33' and moved thereby longitudinally of platform section 14' to the terminal end thereof. The foregoing cycle of substantially continuous movement is repeated throughout the operation of the apparatus, with new bales being deposited within cages 20 after the original bales 16 have been sufficiently reduced in size.

Figure 5:
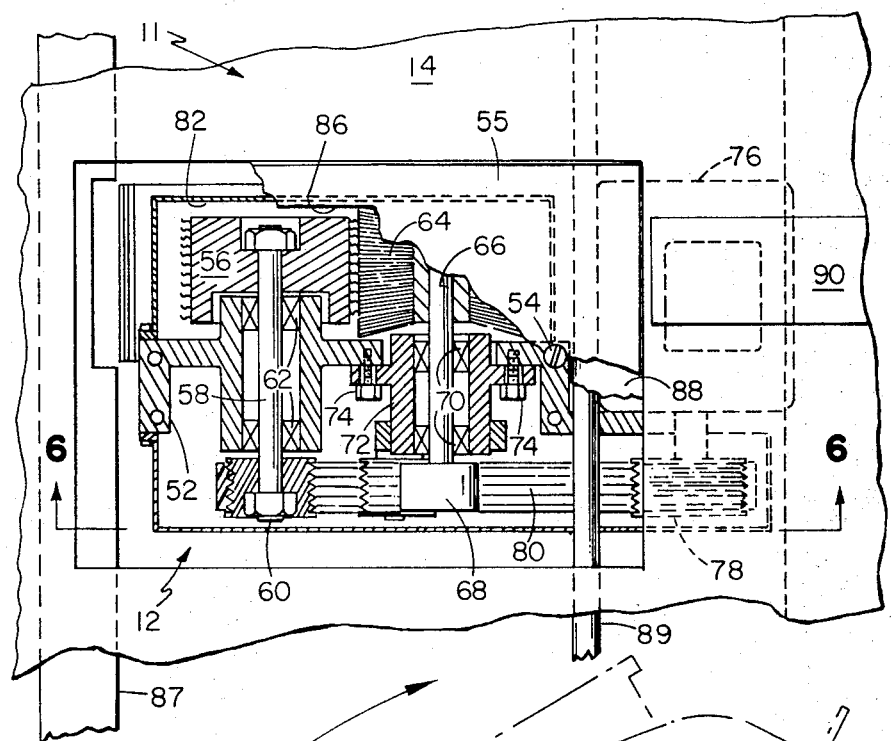
FIG. 5 is an enlarged plan view, partly broken away and partly in section, of a plucking unit of the apparatus.
Figure 6:
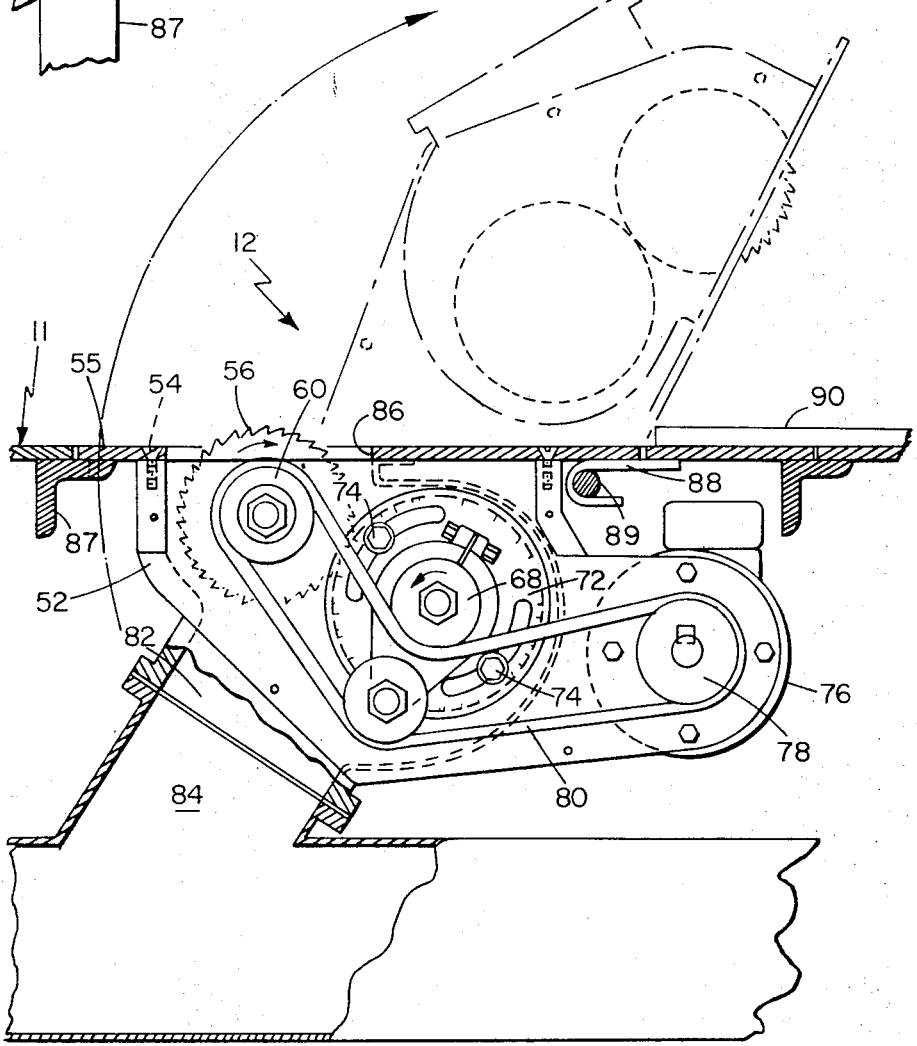
FIG. 6 is a vertical section taken generally along the line 6—6 of FIG. 5.

Size reduction of each bale 16 occurs during each passage thereof over platform sections 14, 14' as a result of fibers then being plucked from its bottom face by the plucker units 12, 12' respectively associated with those sections. Each of the plucker units 12, 12' are identical to that shown in FIGS. 5 and 6 and including a casing 52 detachably connected as by screws 54 to the underside of a plate 55 forming a part of the platform section 14 or 14' with which the plucker unit is associated. A plucker roll element 56, preferably of the continuous-tooth lickerin type, having a shaft 58 and a drive pulley 60 is rotatably mounted by bearings 62 carried upon casing 52. Beneath roll 56, a cooperating brush-type doffer roll 64 having a shaft 66 and drive pulley 68 is similarly mounted by bearings 70 carried within a bracket 72 adjustably secured to casing 52 as by bolts 74. Also mounted upon casing 52 is a motor 76 having an output pulley 78 connected by a belt 80 to pulleys 60, 68 so as to produce rotation of rolls 56, 64 in opposite directions, with the peripheral speed of doffer roll 64 preferably exceeding that of plucker roll 56. Rolls 56, 64 are enclosed by duct-like portion 82 of casing 52, the duct 82 communicating at its lower end with a vacuum duct 84 which may lead, through suitable reserve chambers and control valves or gates, to a fiber-blending machine also similarly communicating with the similar ducts 84 associated with the other plucking units of the present apparatus. The upper end of casing-duct 82 communicates with an opening 86 provided in platform plate 55, through which opening a portion of plucker roll 56 projects for engagement with the lower face of each bale passing over plate 55. Fiber plucked during such engagement from the bale face is doffed from plucker roll 56 by doffer roll 64, and also by the air currents generated by the rolls and by vacuum duct 84, passing therefrom through casing duct 82 to vacuum duct 84.

The platform plate 55 mounting the plucker unit rests at one end upon a frame member 87 and is pivotally supported at its other end by a U-shaped bracket 88 and a rod-shaped frame member 89. This mounting and the compact construction of the plucker units permits each unit to be readily exposed for purposes of inspection or repair, simply by pivoting plate 55 upwardly as shown in broken lines in FIG 6. The unit may then also be removed in itn entirety, and replaced with a substitute unit, by merely lifting upwardly thereon to disengage bracket 88 from rod 89, after first unplugging the electrical leads (not shown) to motor 76.

Figure 3:
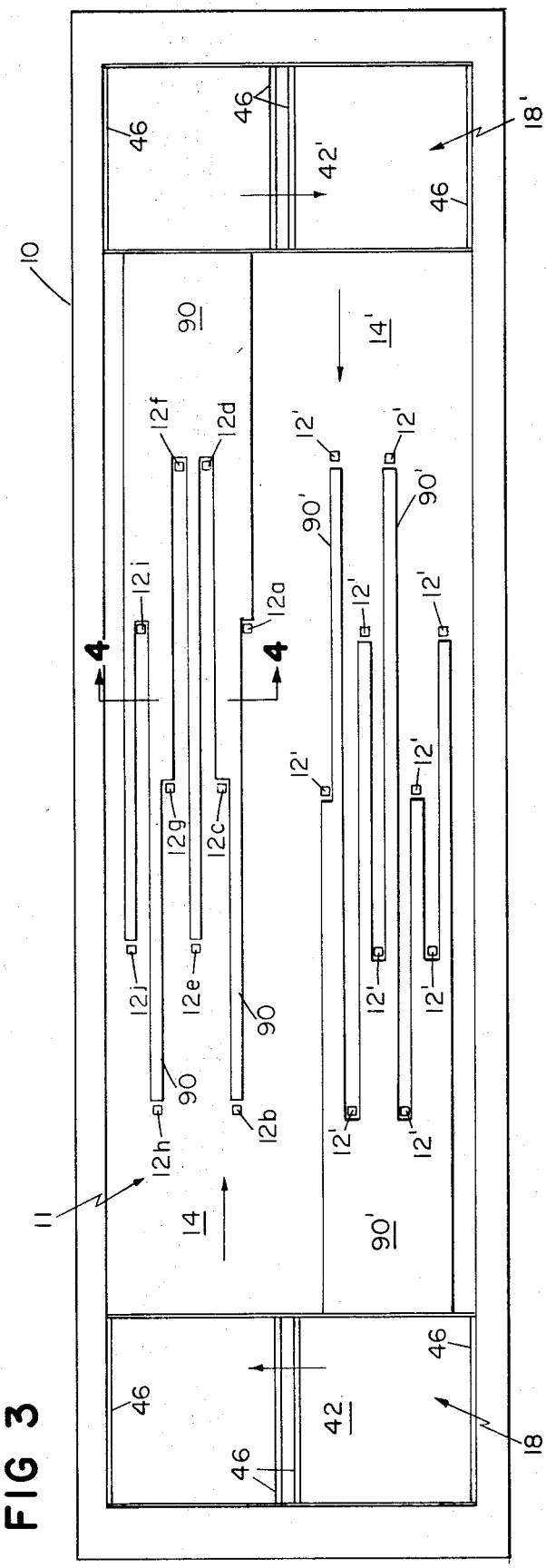
FIG. 3 is a partially diagrammatic plan view of the apparatus of FIG. 1 with the bale cages and bales removed to better show the locations of plucking units and steps associated with the supporting platform.
Figure 4:
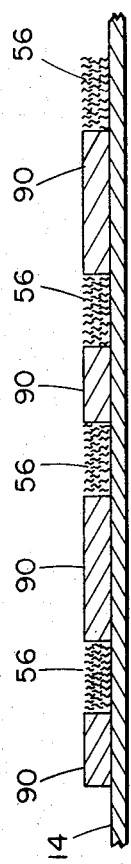
FIG. 4 is an enlarged fragmentary sectional view, taken generally along the lines 4—4 of FIG. 3, showing the steps of one platform section.

As is best shown in FIG. 3, ten plucker units 12 are provided in association with platform section 14, and ten more units 12' in association with platform section 14'. The units 12 are spaced longitudinally and laterally of the path of bale travel along platform 14, and preferably along that central portion thereof where the caged bales 16 are moved at a uniform speed by chain 33. The plucker roll 56 of each unit 12 extends transversely of the path of bale travel along platform section 14—that is, in the width direction of the bottom face of the ten longitudinally-oriented bales 16 moved thereover. The length of each roll 56 is equal to not more than approximately 20%, and preferably as shown only approximately 10%, of bale width, but the rolls 56 of the units 12 associated with platform section 14 collectively span the width dimension of the bale path of travel and the bale faces passing thereover. The units 12 are so spaced longitudinally of the bale path of travel upon platform section 14 that at least the majority and transversely adjacent ones of their respective rolls 56 sequentially engage a bale 16 moved thereover. Thus, a bale 16 moved along platform section 14 and engaging roll 56 of unit 12b does not at the same time engage the transversely adjacent rolls 56 of units 12a or 12c, since these units are among the eight spaced longitudinally of the platform downstream therefrom. While units 12 may be arranged as shown in five pairs 12b and h, e and j . . . d and f so that the rolls 56 of each pair simultaneously engage a bale 16, they need not necessarily be so paired and any which are will, as illustrated by the units 12d and f, have their axially aligned rolls 56 separated by at least one roll length. The spacing of units 12 longitudinally of platform section 14 is such that the lower face of each bale 16 is engaged by at least one plucker roll 56 during substantially all of the time from the bale's passage over the first units 12b and h until its passage over the last units 12d and f of the series, and such that the rolls 56 of each of the units 12 are substantially continuously engaging one of the five bales present at any given time upon platform section 14.

A bale 16 moved onto platform section 14 and over units 12b and h will, during its movement over the rolls 56 of such units, have fibers plucked from two discrete areas of its substantially-planar lower face. Such areas extend in transversely-spaced parallel relationship to each other longitudinally of the bale face, reaching throughout the entire bale length as plucking progresses from its leading to its trailing end, and each has a width extending in the direction and equal to 10% of the bale width. Since the remainder of the bale face, including particularly those portions thereof immediately adjacent the aforesaid two areas, are at this time not plucked and are positively maintained intact by their engagement with platform section 14, rolls 56 of units 12b and h cannot dislodge as a unitary mass any substantial portion of a natural fibrous layer of the bale. The units therefore deliver only fibers which are all relatively opened and free from compressed masses. The lower face of a bale leaving units 12b and h will have grooves therein corresponding in width, length and location to the areas plucked by the two rolls 56 of such units, and in depth to the projection of the rolls above platform 14. Mating elevated step means are preferably provided upon platform section 14 to accommodate such grooves and thus provide more uniform support and weight distribution of the bale during the remainder of its travel longitudinally of platform section 14. The two initial steps 90 which closely follow rolls 56 of the first units 12b and h extend downstream the full remaining length of platform section 14, connecting laterally along the way with the corresponding steps initiating after the sequentially following units 12c, a, i and g. The steps commencing downstream of the latter and all other units similarly laterally interconnect so that, following the terminal units 12f and d of the series and plucking of the last two areas of the bale's bottom face, the resulting composite step 90 extends the full width of the path of bale travel upon platform section 14.

In the absence of steps 90 or other bale-weight equalizing means, it will be appreciated that the later-plucked areas of the bale face would under normal operating conditions bear considerably greater weight than those previously plucked. This would impose differing work-requirements upon the units 12, and would impede the desirably uniform nature of their plucked-fiber output. The provision of steps 90 is therefore preferred, although not mandatory in all instances. In order not to interfere with pivotal movement or removal of platform plates 55, steps 90 may be segmentally formed where passing thereover.

Platform section 14' is as shown also provided with steps 90' extending downstream of the plucker units 12' spaced longitudinally and laterally thereof in the same manner as previously described with respect to units 12 and platform section 14. During each passage of a bale longitudinally of either section 14 or 14', therefore, another layer of fibers is removed from its bottom face, the removal being effected in such a manner as to thoroughly disintegrate the layer and to produce substantially uniform quantities of plucked fibers which are relatively open and free from compressed masses. Since each transfer of a bale from one to the other of the elongate platform sections is accompanied, in effect, by a reversal of the bale's leading end-trailing end orientation, shingling of the bale—that is, uneven reduction thereof from end-to-end—is avoided. The independent nature of each of the 20 plucking units of the apparatus greatly facilitates its operating efficiency and ease of maintenance, and enhances the capabilities for diversified blending—if and as desired—of the plucked fibers.

While a specific embodiment of the invention has been shown and described, this was for purposes of illustration only, since modifications and other embodiments thereof will be apparent to those skilled in the art and are within the scope of the following claims:

That which is claimed is:

1. Apparatus for opening a textile fiber bale, by plucking fibers from a face thereof, comprising:
   bale supporting means establishing a predetermined path of bale travel;
   bale moving means for moving said bale along said predetermined path of bale travel;
   a set of mutually independent fiber plucker elements intersecting said bale supporting means along said path of bale travel for engagement with said face of said bale moved therealong;
   said elements each individually intersecting a minor part only of said bale supporting means along said path of bale travel in a direction transverse to said path, and said elements collectively spanning said bale supporting means and said path in said direction with at least the majority and transversely adjacent ones thereof being spaced relative to each other longitudinally of said bale supporting means and said path for sequential engagement with said bale face.

2. Apparatus as in claim 1, wherein said bale supporting means includes platform means for supporting said bale during said movement upon said face thereof, said platform means having a plurality of openings therein and said plucker elements projecting upwardly through said openings for engagement with said bale face, and elevated step means extending from adjacent said openings in the direction of said bale travel upon said platform for engagingly supporting said bale during its movement therealong.

3. Apparatus as in claim 1, wherein said bale supporting means includes a bale-supporting platform having first and second sections, said first-mentioned set of plucker elements being spaced along said first platform section, and a second set of said plucker elements spaced along said second platform section, said bale moving means moving said bale about a closed path of travel extending along both of said platform sections and including means for reversing the leading end-trailing end orientation of said bale during passage thereof between said platform sections.

4. Apparatus as in claim 1, wherein said bale supporting means includes a bale-supporting platform having a plurality of floor plates spaced along and defining a part thereof, each of said plates having an opening extending therethrough and a fiber plucker unit including one of said plucker elements mounted upon the underside of said plate, said plucker element being a plucker roll and projecting through said plate opening for engagement with said face of a bale moved along said path of travel upon said platform, and means mounting each of said plates for upward pivotal movement when desired to expose said plucker unit for convenient repair.

5. Apparatus as in claim 4, wherein said plate mounting means includes a separable hinge and each of said plates and the associated plucker unit may when desired be detached completely from said platform for purposes of replacement.

6. Apparatus as in claim 4, wherein each of said plucker units further includes a casing secured to said plate and communicating with said plate opening and with a vacuum duct, a doffer roll, said plucker and doffer rolls being mounted adjacent each other within said casing for rotation in opposite directions at different peripheral speeds, and a motor mounted upon the exterior of said casing and drivably connected to said rolls for imparting said rotation thereto.

7. Apparatus for opening a textile fiber bale, by plucking fibers from a face thereof, comprising:
   a bale supporting means including a platform adapted to support said bale upon said face thereof and establish a predetermined path of bale travel;

bale moving means for moving said bale along said predetermined path of travel upon said platform;

a set of fiber plucker elements projecting above said platform into said path of bale travel for engagement with said bale face moved therealong, said elements in a direction transverse to said path of bale travel each individually intersecting a minor part only thereof while collectively spinning said platform and said path of bale travel, and at least some of said elements being spaced longitudinally of said platform and said path of bale travel for sequential engagement with said bale face;

and elevated step means extending longitudinally of said platform in the direction of said path of bale travel upon said platform from sequentially leading ones of said elements for engagingly supporting said bale during movement thereof to a sequentially following element.

8. Apparatus as in claim 7, wherein said platform includes first and second platform sections each having a set of said plucker elements and said step means associated therewith, said bale moving means moves said bale about a closed path of travel extending upon both of said platform sections and including means for reversing the leading end-trailing end orientation of said bale during passage thereof between said platform sections.

9. Apparatus for opening a textile fiber bale, by plucking fibers from a face thereof having a length dimension and a width dimension, comprising:

fiber plucker means including a plurality of mutually independent plucker units;

bale supporting means;

means mounting said plucker means and said bale supporting means for relative movement and for engagement during said movement between said plucker means and said bale face throughout one of said dimensions of said face;

each said plucker unit during said engagement plucking fiber from discrete areas of said bale face each spanning said one dimension thereof and each extending across a minor part only of the other of said dimensions, said areas collectively spanning said other dimension of said bale face; and said plucker units corresponding in number to said areas and plucking at least the majority and adjacent ones of said areas sequentially.

10. Apparatus as in claim 9, wherein each of said plucker units includes a plucker roll, a doffer roll, means mounting said plucker roll and said doffer roll for rotation adjacent each other, drive means for rotating said plucker roll and said doffer roll in opposite directions and at different peripheral speed, and plucked fiber receiving means, said plucker roll having its axis extending in generally parallel spaced relation to said other dimension of said bale face and having an effective length approximately equal to said minor part of said dimension.

11. Apparatus as in claim 9, wherein each of said plucker units includes a rotatable plucker roll having its axis extending in generally parallel spaced relation to said other dimension of said bale face and having an effective length of not more than approximately 20% of said other dimension.

12. Apparatus as in claim 11, wherein each of said plucker units includes a plurality of said plucker rolls each having an effective length of approximately 10% of said other dimension of said bale face.

References Cited
UNITED STATES PATENTS 1,545,367    7/1925    Tice _____ 19—81
3,407,918    10/1968    Clarke _____ 146—70.1 XR DORSEY NEWTON, Primary Examiner U.S. Cl. X.R.

146—70.1